(12) United States Patent
Lalgudi et al.

(10) Patent No.: US 10,907,005 B2
(45) Date of Patent: Feb. 2, 2021

(54) AQUEOUS PREPOLYMER DISPERSIONS

(71) Applicant: Battelle Memorial Institute, Columbus, OH (US)

(72) Inventors: Ramanathan S. Lalgudi, Westerville, OH (US); Phillip Denen, London, OH (US); Richard P. Heggs, Johnstown, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 0 days.

(21) Appl. No.: 14/431,188

(22) PCT Filed: Sep. 25, 2013

(86) PCT No.: PCT/US2013/061760
§ 371 (c)(1),
(2) Date: Mar. 25, 2015

(87) PCT Pub. No.: WO2014/052498
PCT Pub. Date: Apr. 3, 2014

(65) Prior Publication Data
US 2015/0259462 A1      Sep. 17, 2015

Related U.S. Application Data

(60) Provisional application No. 61/705,288, filed on Sep. 25, 2012.

(51) Int. Cl.
*C08G 18/66* (2006.01)
*C08G 18/75* (2006.01)
(Continued)

(52) U.S. Cl.
CPC ......... *C08G 18/66* (2013.01); *C08G 18/0823* (2013.01); *C08G 18/12* (2013.01);
(Continued)

(58) Field of Classification Search
CPC .. C08G 18/66; C08G 18/755; C08G 18/4288; C08G 18/348; C08G 18/0823;
(Continued)

(56) References Cited

U.S. PATENT DOCUMENTS 6,239,209 B1 * 5/2001 Yang .................. C08F 283/006
524/457
6,586,523 B1 * 7/2003 Blum ................. C08G 18/0828
427/389.7
(Continued)

FOREIGN PATENT DOCUMENTS

CA         2476476         *  2/2003   ........... C09D 175/14
WO     2003068879 A1       8/2003
(Continued)

OTHER PUBLICATIONS

International Search Report dated Dec. 17, 2013 in corresponding PCT application PCT/US2013/61760.
English Machine Translation of Description for WO2003068879.

*Primary Examiner* — Michael L Leonard
(74) *Attorney, Agent, or Firm* — Benesch, Friedlander, Coplan & Aronoff LLP

(57) ABSTRACT

Aqueous prepolymer dispersions are provided, as are methods for making aqueous prepolymer dispersions. For example, an aqueous polyurethane prepolymer dispersion may be prepared by a process. The process may include contacting a soybean oil polyester polyol and an isocyanate reactive monomer together in a first mixture. The isocyanate reactive monomer may be functionalized with a tertiary amine salt of an isocyanate-unreactive organic acid. The process may include contacting the first mixture with a diisocyanate to form a neutralized polyurethane prepolymer. The process may include contacting the neutralized poly-
(Continued)

urethane prepolymer with water to form the aqueous polyurethane prepolymer dispersion.

16 Claims, 6 Drawing Sheets

(51) Int. Cl.
*C09D 175/06* (2006.01)
*C08G 18/34* (2006.01)
*C08G 18/12* (2006.01)
*C08G 18/42* (2006.01)
*C08G 18/08* (2006.01)
*C08L 75/06* (2006.01)
*C08K 3/22* (2006.01)

(52) U.S. Cl.
CPC ....... *C08G 18/348* (2013.01); *C08G 18/4288* (2013.01); *C08G 18/755* (2013.01); *C08L 75/06* (2013.01); *C09D 175/06* (2013.01); C08K 2003/2241 (2013.01); C08L 2201/54 (2013.01)

(58) Field of Classification Search
CPC ................ C08L 75/06; C08L 2201/54; C08L 2003/2241; C09D 175/06
See application file for complete search history.

(56) References Cited

U.S. PATENT DOCUMENTS

| | | | |
|---|---|---|---|
| 2003/0069380 A1* | 4/2003 | Flat ................... | C08G 18/0823 528/44 |
| 2005/0238815 A1* | 10/2005 | Dvorchak .......... | C08G 18/0823 427/487 |
| 2008/0009601 A1* | 1/2008 | Killilea ............. | C08G 18/0823 528/44 |
| 2011/0236667 A1 | 9/2011 | Blum et al. | |
| 2011/0269978 A1* | 11/2011 | Garbark ................ | C11C 3/003 554/37 |
| 2012/0259063 A1* | 10/2012 | Gertzmann ........ | C08G 18/0823 524/591 |
| 2013/0041072 A1* | 2/2013 | Sommer ........... | C08G 18/0823 523/415 |

FOREIGN PATENT DOCUMENTS

| | | | | |
|---|---|---|---|---|
| WO | 2008086977 A1 | 7/2008 | | |
| WO | WO 2011107398 A1 * | 9/2011 | ......... | C08G 18/0823 |

\* cited by examiner

AQUEOUS PREPOLYMER DISPERSIONS

CROSS-REFERENCE TO RELATED APPLICATIONS

This application is a National stage entry under 35 U.S.C. § 371 of PCT/US2013/061760, filed Sep. 25, 2013, which claims priority from U.S. Provisional Patent Application Ser. No. 61/705,288, filed Sep. 25, 2012, the entirety of each of which are incorporated herein by reference.

BACKGROUND

Polyurethanes may be used in such applications as coatings, foams, sealants, and adhesives. Conventional polyurethane dispersions (PUDs) were typically solvent- and petroleum-based. Such conventional solvent- and petroleum-based PUDs usually contain a significant amount of volatile organic compounds (VOCs) and may otherwise be toxic and polluting.

Increasing awareness of the need to reduce VOCs has led to efforts to develop aqueous-based (as compared to solvent-based) PUDs. A known approach for making aqueous PUDs is shown in FIG. 1. Known aqueous PUDs typically include a polyol, diisocyanates, and emulsifiable monomers. Most of the suitable emulsifiable monomers may be ionic in nature and, therefore, may be soluble primarily in polar aprotic solvents such as N-methyl-2-pyrrolidone (NMP), which may be a major contributor to VOC levels.

Further, the benefits of using bio-based starting materials (as compared to petroleum-based starting materials) may be well known. Among other benefits, the use of bio-based starting materials alleviates the consumption of resources that harm the environment in terms of biodegradability, toxicity, and pollution.

Bio-based and NMP-free aqueous PUDs and methods for making the same are needed.

SUMMARY

In one embodiment, an aqueous polymer dispersion is provided. The aqueous polymer dispersion may be prepared by a process. The process may include contacting a polyol, a reactive monomer having ionic functionality, and a tertiary amine to form a first mixture. The first mixture may include the polyol and a reactive monomer having its ionic functionality neutralized. The process may include contacting the first mixture with a diisocyanate to form a neutralized pre-polymer. The process may include contacting the neutralized pre-polymer with water.

In one embodiment, a polyurethane dispersion is provided. The polyurethane dispersion may be prepared by a process. The process may include:
(1) contacting a polyol, dimethylol propionoic acid, and a tertiary amine to form a first mixture; the first mixture may include neutralized dimethylol propionoic acid and the polyol;
(2) contacting the first mixture with a diisocyanate compound to form a neutralized pre-polymer; and
(3) dispersing the neutralized pre-polymer in water.

In another embodiment, an aqueous polyurethane dispersion is provided. The aqueous polyurethane dispersion may include the reaction product of:
(1) a first mixture, including:
    (a) a soybean oil polyester polyol;
    (b) dimethylol propionoic acid; and
    (c) triethylamine,
(2) isophorone diisocyanate; and
(3) water.

In another embodiment, a method for making an aqueous polyurethane dispersion is provided. The method may include:
(1) contacting a soybean oil polyester polyol, dimethylol propionoic acid, and triethylamine to form a first mixture;
(2) contacting the first mixture with a diisocyanate to form a substantially neutral pre-polymer; and
(3) dispersing the substantially neutral pre-polymer in water.

In one embodiment, an aqueous polyurethane prepolymer dispersion is provided. The aqueous polyurethane prepolymer dispersion may be prepared by a process. The process may include contacting a soybean oil polyester polyol and an isocyanate reactive monomer together in a first mixture. The isocyanate reactive monomer may be functionalized with a tertiary amine salt of an isocyanate-unreactive organic acid. The process may include contacting the first mixture with a diisocyanate to form a neutralized polyurethane prepolymer. The process may include contacting the neutralized polyurethane prepolymer with water to form the aqueous polyurethane prepolymer dispersion.

BRIEF DESCRIPTION OF THE DRAWINGS

The accompanying figures, which are incorporated in and constitute a part of the specification, illustrate various example systems, methods, results, and so on, and are used merely to illustrate various example embodiments.

DETAILED DESCRIPTION

The present embodiments disclose bio-based and aqueous polymer dispersions and methods for making the same, which may be substantially or completely free of organic solvents such as N-methyl pyrrolidone.

In one embodiment, an aqueous polymer dispersion is provided. The aqueous polymer dispersion may be prepared by a process. The process may include: contacting a polyol, a reactive monomer having ionic functionality, and a tertiary amine to form a first mixture. The first mixture may include the polyol and a reactive monomer having neutralized ionic functionality. The process may include contacting the first mixture with a diisocyanate to form a neutralized pre-polymer; and contacting the neutralized pre-polymer with water. In one embodiment, the aqueous PUD may be substantially or completely VOC-free.

Polyols

Figure 1:
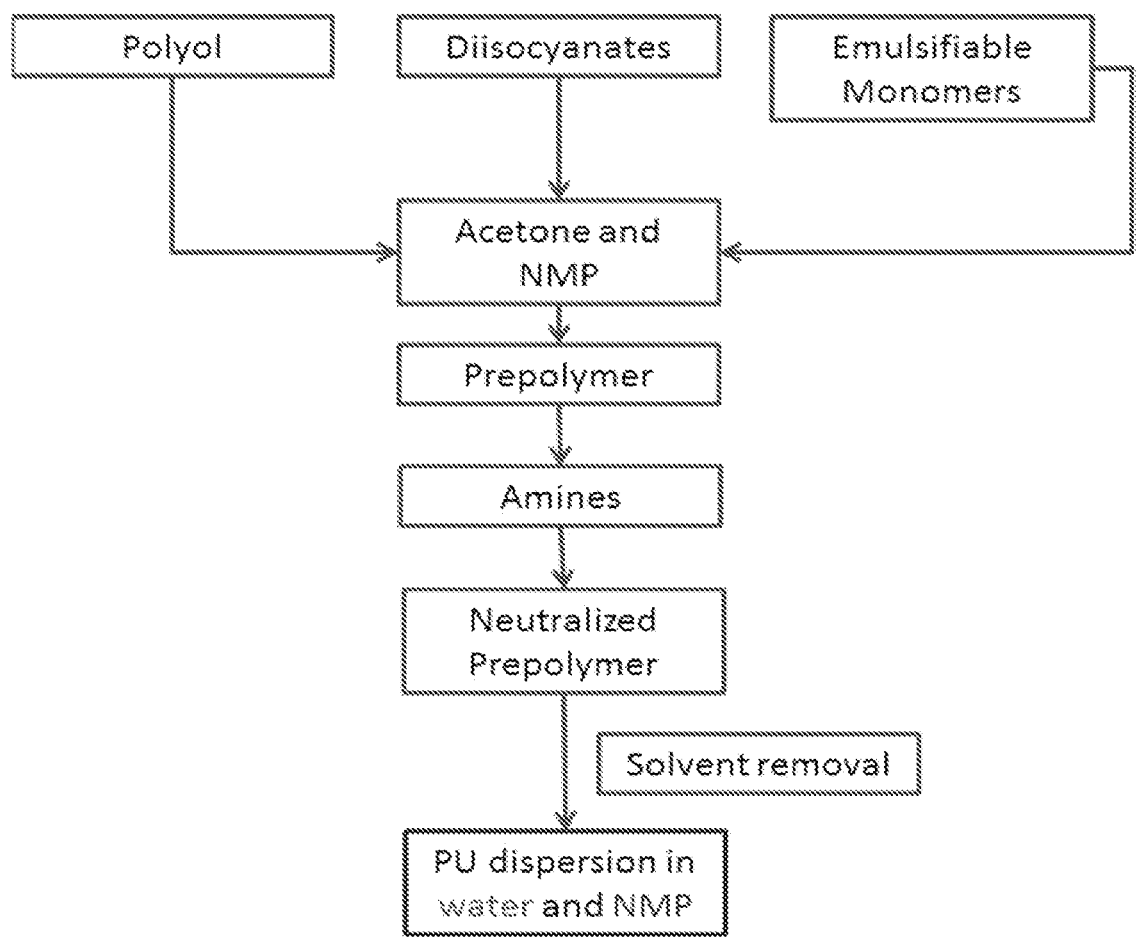
FIG. 1 is a flow chart of a prior art approach for making aqueous PUDs.
Figure 2:
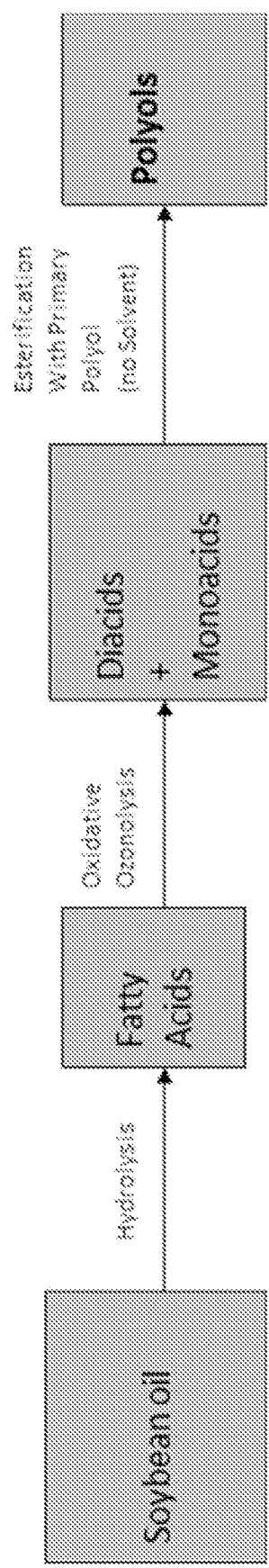
FIG. 2 illustrates an example process for producing a soybean oil polyester polyol from soybean oil.
Figure 3:
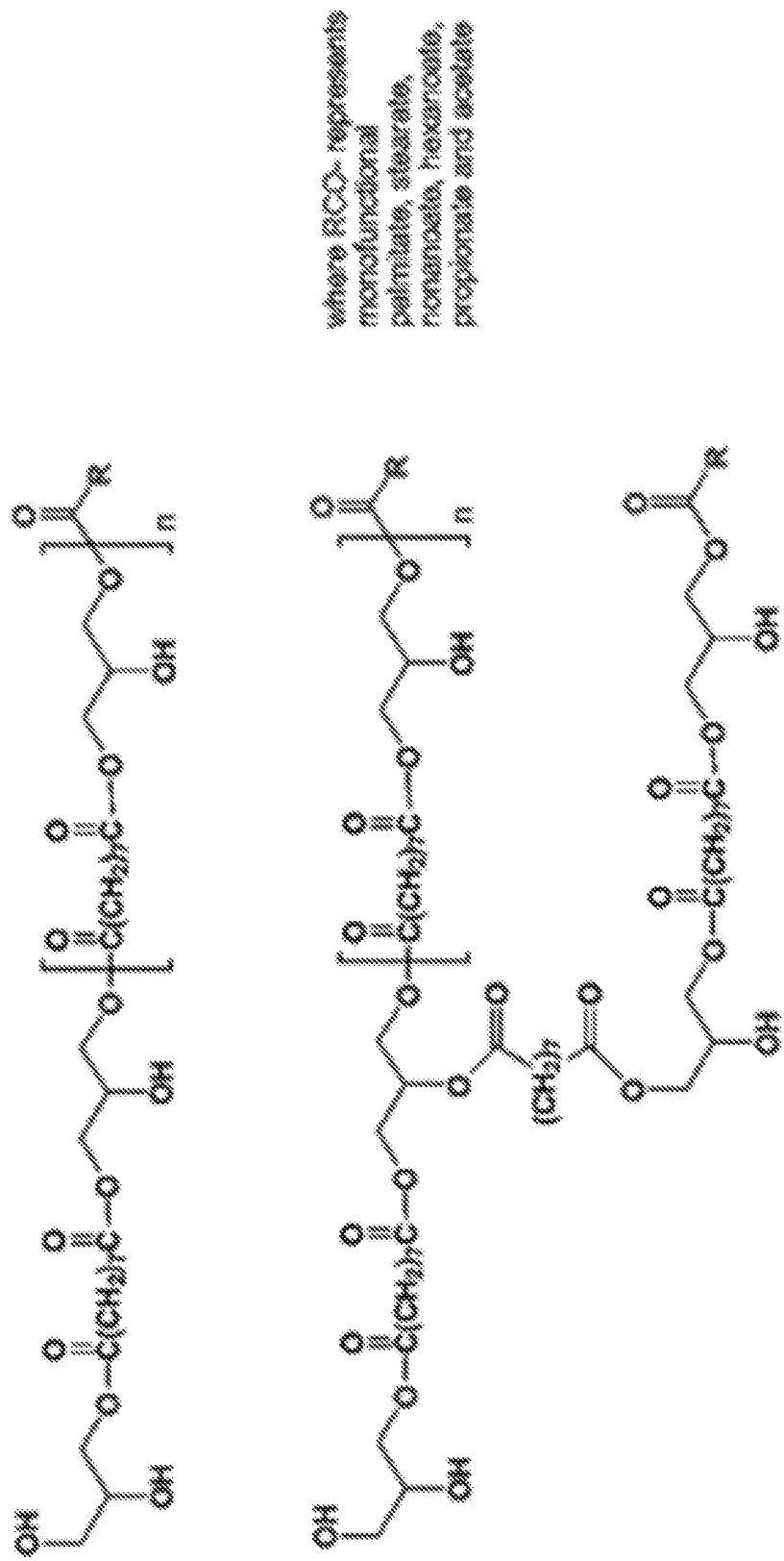
FIG. 3 illustrates an example chemical composition of a soybean oil polyester polyol.

In one embodiment, the polyol may include a soybean oil based polyol. For example, in one embodiment, the soybean oil based polyol may be a soy oil polyester polyol (SOPP) such as the SOPP developed at Battelle Memorial Institute using an oxidative ozonolysis of soybean fatty acids, as described in U.S. Patent Publication No. 2011/0269978, entitled "Solvent-less preparation of polyols by ozonolysis," which is incorporated by reference herein in its entirety. In one embodiment, the SOPP may be EMEROX® 14100 (manufactured by Emery Oleochemicals Group, Cincinnati, Ohio). FIG. 2 illustrates an example process for producing the SOPP from soybean oil. FIG. 3 illustrates an example chemical composition of the SOPP. Example physical properties for the SOPP are listed in Table 1.

TABLE 1

Properties of soybean oil polyester polyol.

| Properties | Typical Values |
| --- | --- |
| Appearance, 25° C. | Clear liquid |
| Acid value, mg KOH/g | 1.5 max. |
| Color, Gardner | 7 max. |
| Hydroxyl value, mg KOH/g | 180.0-250.0 |
| Moisture, % | 0.5 max. |
| Viscosity, 25° C., cps. | 1,200-2,600 |
| Functionality | 4-6 |
| Molecular weight | 1700 |

In another embodiment, the polyol may include a petroleum derived polyester polyol, such as, for example, polyadipate ester polyol. In other embodiments, the polyol may include polyether polyol, ethylene glycol, propylene glycol, or glycerin, or a mixture thereof.

Reactive Monomers

The reactive monomers may be soluble in plant derived polyester polyols such as soybean oil based polyols, petroleum based polyols including, for example, polyadipate ester polyol, and polyether polyol, ethylene glycol, propylene glycol, glycerin, acetone, methyl ethyl ketone, butyl acetate, methyl isobutyl ketone, methyl isoamyl ketone, and water.

The reactive monomers may be amenable to undergo step growth polycondensation to produce polymers that may be exemplified by polyurethane, polyurethane urea, polyurea, polyesters, polyamides, and co-polymers thereof.

The reactive monomers may be capable of forming high molecular weight polymers that may be further dispersed in water without need of significant, or in some embodiments any, polar aprotic solvents such as NMP, MEK, NN-dimethyl acetamide, and N-methyl formamide.

In one embodiment, the reactive monomer may include dimethylol propionic acid (DMPA). In other embodiments, the reactive monomer may have the reactive functionality R and the ionic functionality I as set forth below:

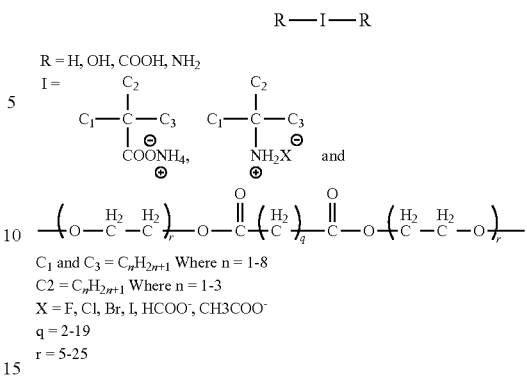

$C_1$ and $C_3 = C_nH_{2n+1}$ Where n = 1-8
$C_2 = C_nH_{2n+1}$ Where n = 1-3
X = F, Cl, Br, I, HCOO⁻, CH3COO⁻
q = 2-19
r = 5-25

In one embodiment, the ionic functionality of the reactive monomers may be subject to neutralization by contacting with a tertiary amine. Upon neutralization, the neutralized reactive monomers may be significantly more soluble in, e.g., acetone.

Tertiary Amines

In one embodiment, the tertiary amine serves to neutralize the reactive monomer's ionic functionality prior to polymerization, thereby rendering the reactive monomer significantly more soluble. For example, in one embodiment, the tertiary amine may include triethylamine (TEA), which may serve to neutralize the reactive monomer (e.g., DMPA) to form neutralized reactive monomer (e.g., n-DMPA). n-DMPA may be significantly more soluble than its non-neutralized counterpart in, e.g., acetone.

In another embodiment, the tertiary amine acts as a catalyst in the urethane forming reaction and, therefore, avoids the use of toxic tin catalysts such as dibutyl tin dilaurate.

Besides TEA, other suitable tertiary amines include those that may be unreactive to diisocyanates, such as diisopropylethylamine, N-methylmorpholine, and mixtures thereof.

Diisocyanates

In one embodiment, the diisocyanate may include an aliphatic diisocyanate such as, for example, isophorone diisocyanate (IPDI) or hexamethylene diisocyanate.

Aqueous PUDs

Aqueous PUDs according to the present embodiments may be useful to make coatings, inks, adhesives, and sealants.

Figure 4:
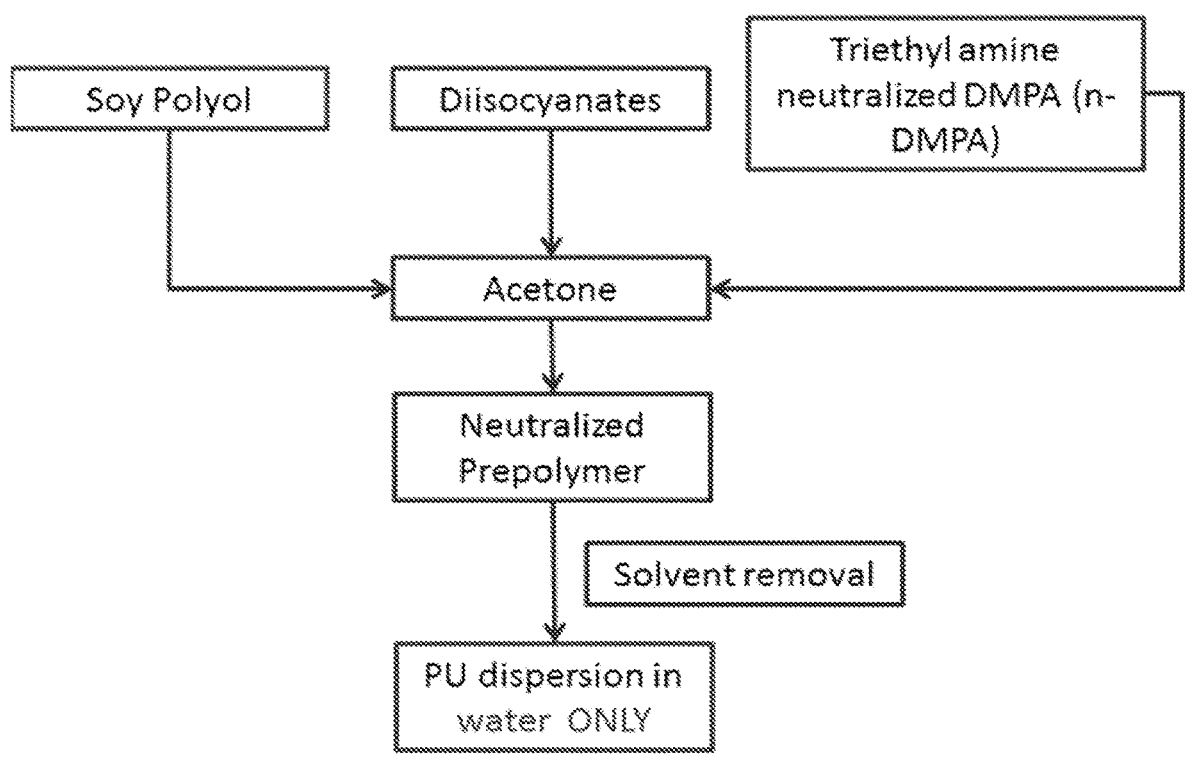
FIG. 4 is a flow chart of one embodiment of the present invention for making substantially or completely VOC-free aqueous PUDs from soy polyol and neutral dimethylol propionoic acid.

In one embodiment, an aqueous PUD is provided. The aqueous PUD may be prepared by a process. The process may include contacting a SOPP, DMPA, and TEA, in the presence of acetone, to form a first mixture including the SOPP and n-DMPA. The n-DMPA may be completely soluble in acetone. The process may include contacting the first mixture with IPDI to form a neutralized pre-polymer. The process may include dispersing the neutralized pre-polymer in water. FIG. 4 is a flow chart of one embodiment of the present invention for making substantially or completely VOC-free aqueous PUDs from SOPP and n-DMPA.

In one embodiment, a polyurethane dispersion is provided. The polyurethane dispersion may be prepared by a process. The process may include: (1) contacting a SOPP, DMPA, and a tertiary amine to form a first mixture; the first mixture may include n-DMPA and the SOPP; (2) contacting the first mixture with a diisocyanate compound to form a neutralized pre-polymer; and (3) dispersing the neutralized pre-polymer in water.

In another embodiment, an aqueous polyurethane dispersion is provided, the aqueous polyurethane dispersion including the reaction product of:
(1) a first mixture, including:
  (a) a SOPP having a hydroxyl value of from about 180-250 mg KOH/g;
  (b) DMPA; and
  (c) triethylamine,
(2) IPDI; and
(3) water.

In another embodiment, a method for making an aqueous polyurethane dispersion is provided, the method including:
(1) contacting a SOPP, DMPA, and TEA to form a first mixture;
(2) contacting the first mixture with a diisocyanate to form a substantially neutral pre-polymer; and
(3) dispersing the substantially neutral pre-polymer in water.

In one embodiment, the aqueous PUDs disclosed herein may be substantially VOC-free. "Substantially VOC-free," as used herein means that less than or equal to 0.9% by weight of solvent remains in the dispersions. However, the aqueous PUDs disclosed herein may have less than or equal to 0.5% by weight, less than or equal to 0.3% by weight, or 0% of VOC ("VOC-free") remaining in the dispersions.

EXAMPLES

Example 1

Synthesis of Aqueous PUDs

DMPA, EMEROX® 14100, acetone, and TEA were stirred at room temperature in a 500 ml reactor equipped with a dry argon spurge, a mechanical stirrer, a thermocouple, and a cold water condenser until the contents were clear. The n-DMPA was completely soluble in acetone.

The reactants were heated to 55° C. and charged with IPDI over a period of 30 min. The reaction was held at 55° C. until the isocyanate content reached 3%.

The neutralized pre-polymer was added to DI water with stirring (600 rpm) followed by acetone removal under vacuum to produce the aqueous PUD.

PUDs with various amounts of SOPP and n-DMPA were synthesized at constant IPDI/hydroxyl mole ratio (Table 2).

TABLE 2

Compositional variations for making PUDs.

| Key Ingredients | Composition (wt %) in the experiments | | | | |
|---|---|---|---|---|---|
| | 1 | 2 | 3 | 4 | 5 |
| n-DMPA | 8.9 | 10.9 | 12.9 | 15.1 | 17.3 |
| Soy Polyol (EMEROX ® 14100) | 54.2 | 51.5 | 48.7 | 45.9 | 42.9 |
| IPDI | 36.9 | 37.6 | 38.4 | 39.1 | 39.9 |

Expressed another way, the compositional variations of all of the ingredients for making the PUDs is shown in Table 2A.

TABLE 2A

Compositional variations for making PUDs.

| Ingredients | Amount added in reaction (grams) | | | | |
|---|---|---|---|---|---|
| | 1 | 2 | 3 | 4 | 5 |
| n-DMPA | 5.5 | 6.6 | 7.7 | 8.8 | 9.9 |
| Soy Polyol (EMEROX ® 14100) | 58.7 | 54.7 | 50.8 | 46.9 | 43.0 |
| IPDI | 40.0 | 40.0 | 40.0 | 40.0 | 40.0 |
| TEA | 4.1 | 5.0 | 5.8 | 6.6 | 7.5 |
| Acetone | 108.3 | 106.3 | 104.3 | 102.3 | 100.3 |

The properties of the NMP-free PUDs are provided in Table 3.

TABLE 3

Properties of PUDs obtained from SOPP.

| Properties | Experiments | | | | |
|---|---|---|---|---|---|
| | 1 | 2 | 3 | 4 | 5 |
| pH @ 25° C. | Unstable Dispersion | 7.3 | 7.6 | 7.8 | 8.3 |
| Viscosity (cP) @25° C. LVT Spindle 62 RPM = 60 | | 80 | 6400** | 60 | 45 |
| Solid content of final PUD (%) | | 46 | 42 | 36 | 36 |
| Tg (° C.) | | | 29 | 43 | 55 |
| % Soy content | | 52 | 49 | 46 | 43 |

**LVT Spindle 62 RPM = 3 pH. A Metrohm Titrino 798 MPT fitted with an aqueous pH probe 6.0233.100 was used to measure the pH of the PUDs.

Figure 5:
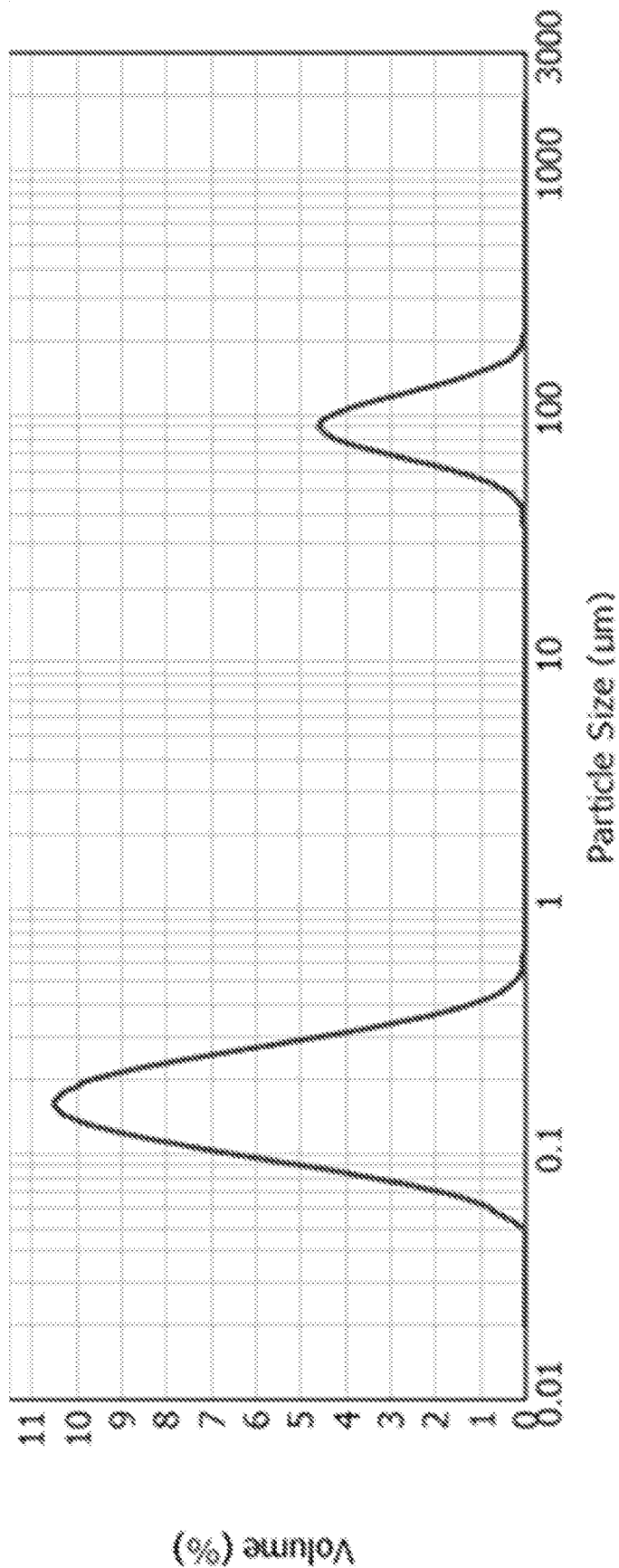
FIG. 5 illustrates particle size distribution data of one embodiment of a PUD prepared by one embodiment of the present invention.

Particle size. Aqueous PUDs according to the present embodiments have particle sizes between about 20 nm and 5 microns. A Mastersizer 2000 with a Hydro 2000 µP cell (Malvern Instruments Ltd., Westborough, Mass.) was used to determine the particle size of the PUDs. Water was used as the medium in the cell. The instrument was calibrated using 0.1 µm polystyrene standards (DUKE STANDARDS™, Thermo Scientific, Waltham, Mass.). The average particle size of the PUDs obtained with 10 wt % n-DMPA concentration was found to be 150 nm. FIG. 5 illustrates the particle size distribution of the PUDs. The larger particle size present in the 100 microns region in the particle size distribution graph may be due to the presence of air bubbles generated during analysis and not larger polymer particles.

Figure 6:
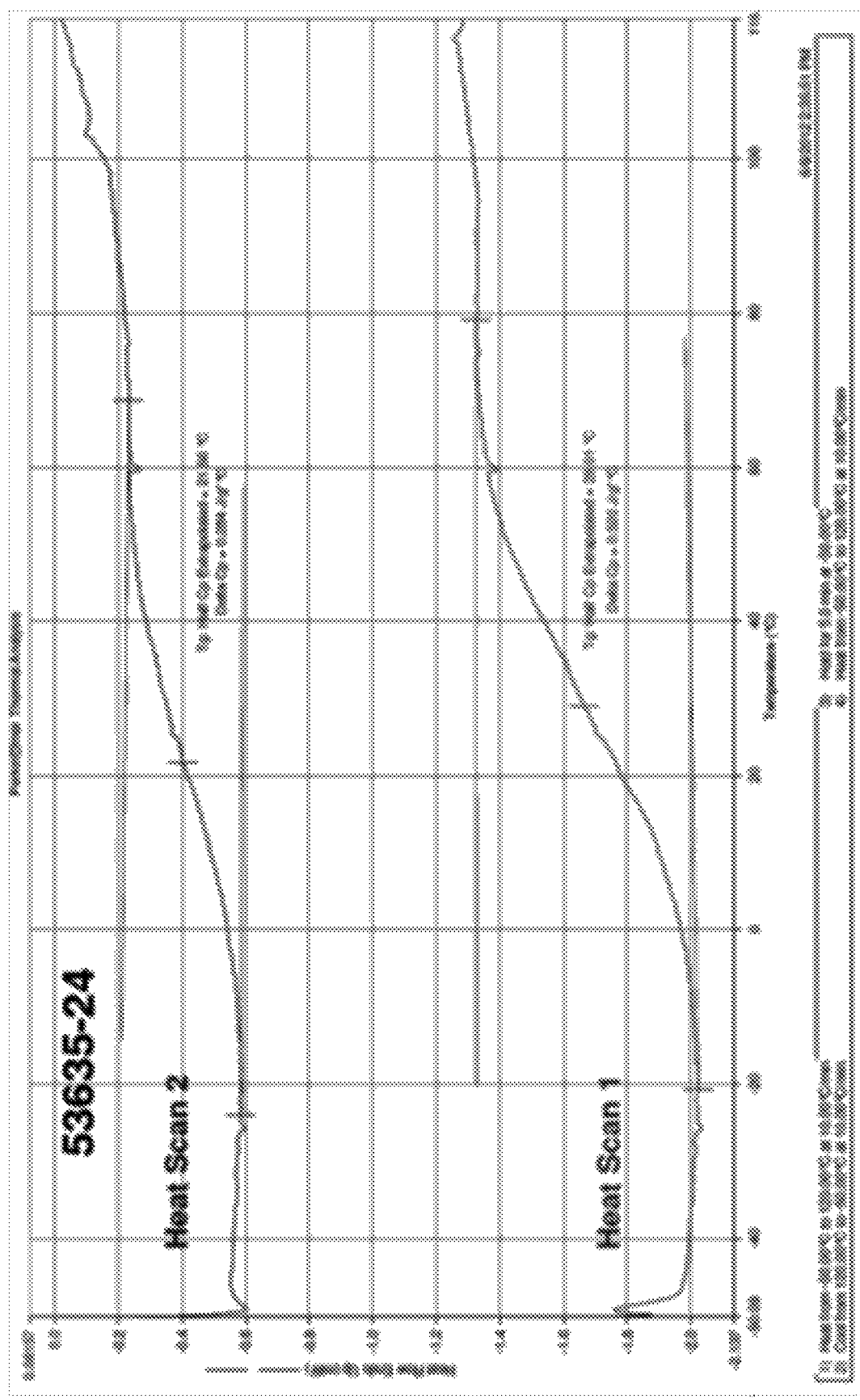
FIG. 6 illustrates glass transition temperature data of one embodiment of a PUD prepared by one embodiment of the present invention.

Tg. The glass transition temperature of the PUDs was determined using dynamic scanning calorimetry (DSC). A representative glass transition temperature curve is shown in FIG. 6. As the SOPP content increases, the Tg decreases.

The PUDs were most stable in water when the concentration of n-DMPA was higher than 10 wt %. Although not wishing to be bound by theory, the stability dependence on n-DMPA concentration may be due to the fact that at lower n-DMPA concentrations the ionic strength of the pre-polymer may not be sufficient to stabilize the polymer particles via electrostatic stabilization. Ionic strength may enhance the dispersion stability.

Example 2

PUD Coating Performance

The PUDs obtained from runs 2 to 5 formed excellent films on drying. As noted above, ionic strength enhances the dispersion stability of the PUDs. However, increased ionic strength was detrimental to the coating at a point, as increased ionic strength correlated with moisture sensitivity. To test moisture sensitivity, several drops of DI water were placed on the surface of the coating and covered with a Petri dish. Changes in appearance and adhesion loss were noted after 24 h. In one embodiment, 10 to 12 wt % n-DMPA was optimal for forming stable PUDs with good water resistance properties. The samples obtained from runs 2 and 3 showed excellent water resistance (i.e., no haziness and good adhesion to the substrate after 24 h exposure) without any additional crosslinkers. The water resistance of samples from runs 4 and 5 may not be adequate due to the higher ionic concentrations. However, the water resistance was improved with the addition of 5 wt % water dispersible isocyanate crosslinker.

Example 3

PUDs as Chemical Agent Resistance Coatings

Aqueous PUDs according to the present embodiments may be useful for making chemical agent resistance coatings (CARCs), and may be capable of decontaminating the chemical agents.

The CARC was formulated by mixing 100 parts of PUD obtained from run 3, 5 parts of isocyanate crosslinker, and 15 parts of titanium dioxide. The coating was applied on a steel coupon, dried at room temperature for 48 h, and evaluated. A common commercial petroleum based CARC coating made of two components was tested as a comparative sample. The first component may be a PUD and the second component may be a water dispersible isocyanate crosslinker. ASTM D3359-02 was followed to measure the adhesion of the coatings. The experimental coatings had slightly lower adhesion when compared to the commercial CARC tested.

To test methyl ethyl ketone (MEK) resistance, a soft wipe was attached to a standard home improvement hammer using a piece of copper wire. The wipe was generously wet with MEK and passed over the coating with no downward pressure. Up to 200 double rubs were performed with wetting of the wipe every 100 double rubs. The coating may be determined to have passed if it is unaffected with 200 double rubs. If the coating does not pass the 200 double rubs, the number of double rubs before the failure occurred was recorded. (A "double rub" is defined as one pass forward and one pass backward across the coating). The experimental coatings passed 200 MEK double rubs, which suggests that the coating obtained from SOPP based PUD had comparable crosslink density as that of petroleum derived PUD coatings.

To test chemical agent resistance, 2 µl of simulants were dispensed onto the coating; TRAINSAF® G, a nerve agent simulant, and TRAINSAF® H, a sulfur mustard simulant (CET, LLC, Sugar Land, Tex.). The contact angle of the droplets was determined using a VCA Optima contact angle instrument. The experimental coatings resisted the chemical agent simulants very well as was evident by the contact angles on the coated surface. Complete wetting of the simulants (contact angle=0 deg) would be expected if the coatings would not have resisted the chemical agent simulants. The contact angle of the simulants on the surface of the experimental coatings was slightly higher than the commercial control coatings. Furthermore, the simulants contain a UV marker and, from the UV images after exposure, there is no evidence of residual simulant. These observations conclusively suggest that SOPP based PUDs have the potential to be a viable bio-based alternative to the petroleum based PUDs in the CARC applications.

As noted above, ASTM D3359-02 was followed to measure the adhesion of the coatings. Referring to Table 5, 5B indicates the edges of the cuts may be completely smooth and none of the squares of the lattice is detached. 4B indicates small flakes of the coating may be detached at intersections; less than 5% of the area is affected.

Table 4 collects the performance parameters of the SOPP based PUD versus the commercial control.

TABLE 4

Performance of SOPP based PUD.

| Sample | Contact Angle (deg) | | Adhesion | MEK double rubs |
| --- | --- | --- | --- | --- |
| | TrainSaf G | TrainSaf H | | |
| Commercial Control | 18.2 | 16.3 | 5B | Passed 200 |
| Experimental | 21.0 | 20.7 | 4B | Passed 200 |

In various embodiments, an aqueous polymer dispersion is included. The aqueous polymer dispersion may be prepared by a process. The process may include contacting a polyol, a reactive monomer having ionic functionality, and a tertiary amine to form a first mixture. The first mixture may include the polyol and the reactive monomer. In the first mixture, the ionic functionality of the reactive monomer may be neutralized, for example, by the tertiary amine. The process may include contacting the first mixture with a diisocyanate to form a neutralized pre-polymer. The process may also include contacting the neutralized pre-polymer with water to provide the aqueous polymer dispersion.

In some embodiments, the ionic functionality of the reactive monomer may be substantially neutralized by the tertiary amine. The ionic functionality of the reactive monomer may be completely neutralized by the tertiary amine. The tertiary amine may be provided in a molar amount at least about substantially equivalent to the molar amount of the ionic functionality of the reactive monomer. The tertiary amine may be provided in a molar excess compared to the molar amount of the ionic functionality of the reactive monomer.

In some embodiments, the polyol may include a soybean oil polyester polyol. The polyol may include a soybean oil polyester polyol having a hydroxyl value. For example, the hydroxyl value may be in mg KOH/g, about 25, 50, 75, 100, 125, 150, 160, 170, 180, 190, 200, 210, 220, 230, 240, 250, 260, 270, 280, 290, 300, 325, 350, 375, 400, 425, 450, 475, or 500, or any range between the preceding values. For example, the polyol may include a soybean oil polyester polyol having a hydroxyl value of between about 180 to 250 mg KOH/g.

In several embodiments, the reactive monomer having ionic functionality may have the reactive functionality R and the ionic functionality I as set forth herein. Further, for example, the reactive monomer may include a polyhydroxy carboxylic acid. The reactive monomer may include dimethylol propionic acid. The ionic functionality of the reactive monomers may be subject to neutralization by contacting with the tertiary amine.

In various embodiments, the tertiary amine may be unreactive to diisocyanates. The tertiary amine may include a trialkyl amine or a triaryl amine. For example, the tertiary amine may include triphenylamine, trimethylamine, triethyl amine, tripropylamine, tri(2-propyl)amine, tributylamine, N-methylmorpholine, or combinations thereof such as diisopropylethylamine, or mixtures thereof. For example, the tertiary amine may include triethylamine.

In some embodiments, the diisocyanate may include an aromatic diisocyanate or an aliphatic diisocyanate. For example, the diisocyanate may include isophorone diisocyanate (IPDI) or hexamethylene diisocyanate.

In various embodiments, the aqueous polymer dispersion may be employed to prepare or may be in the form of a coating or adhesive. The aqueous polymer dispersion may be employed to prepare or may be in the form of a substrate coated with the aqueous polymer dispersion. The aqueous polymer dispersion may be employed to prepare or may be in the form of a chemical agent resistance coating.

In some embodiments, a polyurethane dispersion may be included. The polyurethane dispersion may be prepared by a process. The process may include contacting a polyol, dimethylol propionoic acid, and a tertiary amine to form a first mixture. The first mixture may include neutralized dimethylol propionoic acid and the polyol. The process may include contacting the first mixture with a diisocyanate compound to form a neutralized pre-polymer. The process may include dispersing the neutralized pre-polymer in water to form the polyurethane dispersion.

In several embodiments of the polyurethane dispersion, the polyol may include a soybean oil polyester polyol. The polyol may include a soybean oil polyester polyol having a hydroxyl value. For example, the hydroxyl value may be in mg KOH/g, about 25, 50, 75, 100, 125, 150, 160, 170, 180, 190, 200, 210, 220, 230, 240, 250, 260, 270, 280, 290, 300, 325, 350, 375, 400, 425, 450, 475, or 500, or any range between the preceding values. For example, the polyol may include a soybean oil polyester polyol having a hydroxyl value of between about 180 to 250 mg KOH/g.

In various embodiments, the tertiary amine may be unreactive to diisocyanates. The tertiary amine may include a trialkyl amine or a triaryl amine. For example, the tertiary amine may include triphenylamine, trimethylamine, triethyl amine, tripropylamine, tri(2-propyl)amine, tributylamine, N-methylmorpholine, or combinations thereof such as diisopropylethylamine, or mixtures thereof. For example, the tertiary amine may include triethylamine.

In some embodiments, the diisocyanate may include an aromatic diisocyanate or an aliphatic diisocyanate. For example, the diisocyanate may include isophorone diisocyanate (IPDI) or hexamethylene diisocyanate.

In several embodiments, the polyurethane dispersion may be employed to prepare or may be in the form of a coating or adhesive. The polyurethane dispersion may be employed to prepare or may be in the form of a substrate coated with the polyurethane dispersion. The polyurethane dispersion may be employed to prepare or may be in the form of a chemical agent resistance coating.

In various embodiments, an aqueous polyurethane dispersion is provided. The aqueous polyurethane dispersion may include the reaction product of a first mixture, isophorone diisocyanate, and water. The first mixture may include a soybean oil polyester polyol; dimethylol propionoic acid; and triethylamine.

In several embodiments, the aqueous polyurethane dispersion may be employed to prepare or may be in the form of a coating or adhesive. The aqueous polyurethane dispersion may be employed to prepare or may be in the form of a substrate coated with the polyurethane dispersion. The aqueous polyurethane dispersion may be employed to prepare or may be in the form of a chemical agent resistance coating.

In various embodiments, a method for making an aqueous polyurethane dispersion is provided. The method may include contacting a soybean oil polyester polyol, dimethylol propionoic acid, and triethylamine to form a first mixture. The method may also include contacting the first mixture with a diisocyanate to form a substantially neutral pre-polymer. The method may also include dispersing the substantially neutral pre-polymer in water.

In various embodiments, an aqueous polyurethane pre-polymer dispersion is provided. The aqueous polyurethane prepolymer dispersion may be prepared by a process. The process may include contacting a soybean oil polyester polyol and an isocyanate reactive monomer together in a first mixture. The isocyanate reactive monomer may be functionalized with a tertiary amine salt of an isocyanate-unreactive organic acid. The process may include contacting the first mixture with a diisocyanate to form a neutralized polyurethane prepolymer. The process may include contacting the neutralized polyurethane prepolymer with water to form the aqueous polyurethane prepolymer dispersion.

In some embodiments of the aqueous polyurethane prepolymer dispersion, the process may also include contacting an acidic form of the isocyanate reactive monomer functionalized with the isocyanate-unreactive organic acid to the first mixture. The process may also include contacting a basic form of the tertiary amine to the first mixture in at least about one molar equivalent with respect to the acidic form of the isocyanate reactive monomer functionalized with the isocyanate-unreactive organic acid. The process may also include substantially neutralizing the acidic form of the isocyanate reactive monomer functionalized with the isocyanate-unreactive organic acid with the basic form of the tertiary amine to form the isocyanate reactive monomer functionalized with the tertiary amine salt of the isocyanate-unreactive organic acid in the first mixture.

In some embodiments, the soybean oil polyester polyol may be substantially free of or substantially unsubstituted by sulfonate groups. The soybean oil polyester polyol may be substantially free of or substantially unsubstituted by amine or ammonium groups. The soybean oil polyester polyol may have a hydroxyl value. For example, the hydroxyl value may be in mg KOH/g, about 25, 50, 75, 100, 125, 150, 160, 170, 180, 190, 200, 210, 220, 230, 240, 250, 260, 270, 280, 290, 300, 325, 350, 375, 400, 425, 450, 475, or 500, or any range between the preceding values. For example, the soybean oil polyester polyol may have a hydroxyl value of between about 180 to 250 mg KOH/g.

In several embodiments, the isocyanate reactive monomer may be saturated. The isocyanate reactive monomer may be unsubstituted by or free of primary amine or secondary amine groups. The isocyanate reactive monomer may be unsubstituted by or free of sulfur-containing groups. The reactive monomer having ionic functionality may have the reactive functionality R and the ionic functionality I as set forth herein. Further, for example, the reactive monomer may include a polyhydroxy carboxylic acid, such as dimethylol propionic acid. The ionic functionality of the reactive monomers may be subject to neutralization by contacting with the tertiary amine.

In various embodiments, the tertiary amine may be unreactive to diisocyanates. The tertiary amine may include a trialkyl amine or a triaryl amine. For example, the tertiary amine may include triphenylamine, trimethylamine, triethyl amine, tripropylamine, tri(2-propyl)amine, tributylamine, N-methylmorpholine, or combinations thereof such as diisopropylethylamine, or mixtures thereof. For example, the tertiary amine may include triethylamine.

In some embodiments, the diisocyanate may include an aromatic diisocyanate or an aliphatic diisocyanate. For example, the diisocyanate may include isophorone diisocyanate (IPDI) or hexamethylene diisocyanate.

In several embodiments, the first mixture may be substantially free of hydroxy-functionalized organic solvents. The first mixture may be completely free of hydroxy-functionalized organic solvents. The first mixture may include an organic solvent. The process may include separating the organic solvent from the neutralized polyurethane prepolymer. For example, the process may include separating the organic solvent from the neutralized polyurethane prepolymer in the first mixture after formation of the neutralized polyurethane prepolymer. The process may include separating the organic solvent from the neutralized polyurethane prepolymer in the aqueous polyurethane prepolymer dispersion. The process may include separating a percentage of the organic solvent from the neutralized polyurethane prepolymer, for example, at least about 25%, 50%, 75%, 85%, 90%, 95%, 97%, 98%, 99%, 99.5%, 99.8%, or 99.9% of the organic solvent from the neutralized polyurethane prepolymer.

In some embodiments, the aqueous polyurethane prepolymer dispersion may be substantially free of hydroxy-functionalized organic solvents. The aqueous polyurethane prepolymer dispersion may be completely free of hydroxy-functionalized organic solvents. The aqueous polyurethane prepolymer dispersion may be substantially free of organic solvents. For example, the process may include separating the organic solvent to leave the aqueous polyurethane prepolymer dispersion at an organic solvent percentage by weight of less than about 25%, 10%, 5%, 3%, 2%, 1%, 0.5%, 0.25%, 0.2%, 0.1%, or 0.01%. The aqueous polyurethane prepolymer dispersion may be completely free of organic solvents.

In several embodiments, the neutralized polyurethane prepolymer may be formed with less than about one free isocyanate group per molecule of the neutralized polyurethane prepolymer. The neutralized polyurethane prepolymer may be formed substantially free of unreacted isocyanate groups. The neutralized polyurethane prepolymer may be formed substantially free of silane functional groups. The neutralized polyurethane prepolymer being formed substantially free of thiol groups. The neutralized polyurethane prepolymer being formed substantially free of disulfide groups. The neutralized polyurethane prepolymer may be formed substantially free of hydrazine-reactive ketone groups.

In various embodiments, the neutralized polyurethane prepolymer may be formed in the substantial absence of an alkylene glycol. The neutralized polyurethane prepolymer may be formed in the substantial absence of an alkylene glycol ether. The neutralized polyurethane prepolymer may be formed in the substantial absence of a surfactant or surface active agent other than the isocyanate reactive monomer. For example, the neutralized polyurethane prepolymer may be formed in the substantial absence of a surfactant or surface active agent other than the isocyanate reactive monomer. The neutralized polyurethane prepolymer may be formed in the substantial absence of a polyamine, for example, a diamine chain extender. The neutralized polyurethane prepolymer may be formed in the substantial absence of an amino alcohol. The neutralized polyurethane prepolymer may be formed in the substantial absence of an alkanol amide. The neutralized polyurethane prepolymer may be formed in the substantial absence of a polyol other than the soybean oil polyester polyol or the isocyanate reactive monomer. The neutralized polyurethane prepolymer may be formed in the substantial absence of a metal-containing catalyst, for example, di-tert-butyl tin laurate. The neutralized polyurethane prepolymer may be formed in the substantial absence of collagen. The neutralized polyurethane prepolymer may be formed in the substantial absence of hydrazine or a hydrazone. The neutralized polyurethane prepolymer may be formed in the substantial absence of an unsaturated species other than the soybean oil polyester polyol. The neutralized polyurethane prepolymer may be formed in the substantial absence of an isocyanate blocking group. For example, the neutralized polyurethane prepolymer may be formed in the substantial absence of an isocyanate blocking group such as caprolactam, malonic acid diethyl ester, acetoacetic acid ethyl ester, oximes, pyrazoles, and the like. The neutralized polyurethane prepolymer may be formed in the substantial absence of an epoxidized or partially epoxidized triglyceride. The neutralized polyurethane prepolymer may be formed in the substantial absence of an alkyd or alkyd resin. The neutralized polyurethane prepolymer may be formed in the substantial absence of a monohydroxy compound. The neutralized polyurethane prepolymer may be formed in the substantial absence of a siccative curing or drying agent. The neutralized polyurethane prepolymer may be formed in the substantial absence of an amino acid. The neutralized polyurethane prepolymer may be formed in the substantial absence of an ammonium compound. The neutralized polyurethane prepolymer may be formed in the substantial absence of a silane compound. The neutralized polyurethane prepolymer may be formed in the substantial absence of a thiol or disulfide compound. The neutralized polyurethane prepolymer may be formed in the substantial absence of any combination of the preceding the preceding species of the present paragraph. Additionally or alternatively, the neutralized polyurethane prepolymer may be substantially free of any of the preceding species of the present paragraph.

In various embodiments, the aqueous polyurethane prepolymer dispersion may be formed in the substantial absence of an alkylene glycol. The aqueous polyurethane prepolymer dispersion may be formed in the substantial absence of an alkylene glycol ether. The aqueous polyurethane prepolymer dispersion may be formed in the substantial absence of a surfactant or surface active agent other than the isocyanate reactive monomer. For example, the aqueous polyurethane prepolymer dispersion may be formed in the substantial absence of a surfactant or surface active agent other than the isocyanate reactive monomer. The aqueous polyurethane prepolymer dispersion may be formed in the substantial absence of a polyamine, for example, a diamine chain extender. The aqueous polyurethane prepolymer dispersion may be formed in the substantial absence of an amino alcohol. The aqueous polyurethane prepolymer dispersion may be formed in the substantial absence of an alkanol amide. The aqueous polyurethane prepolymer dispersion may be formed in the substantial absence of a polyol other than the soybean oil polyester polyol or the isocyanate reactive monomer. The aqueous polyurethane prepolymer dispersion may be formed in the substantial absence of a metal-containing catalyst, for example, di-tert-butyl tin laurate. The aqueous polyurethane prepolymer dispersion may be formed in the substantial absence of collagen. The aqueous polyurethane prepolymer dispersion may be formed in the substantial absence of hydrazine or a hydrazone. The aqueous polyurethane prepolymer dispersion may be formed in the substantial absence of an unsaturated species other than the soybean oil polyester polyol. The aqueous polyurethane prepolymer dispersion may be formed in the substantial absence of an isocyanate blocking group. For example, the aqueous polyurethane prepolymer dispersion may be formed in the substantial absence of an isocyanate blocking group such as caprolactam, malonic acid diethyl ester, acetoacetic acid ethyl ester, oximes, pyrazoles, and the like. The aqueous polyurethane prepolymer dispersion may be formed in the substantial absence of an epoxidized or partially epoxidized triglyceride. The aqueous polyurethane prepolymer dispersion may be formed in the substantial absence of an alkyd or alkyd resin. The aqueous polyurethane prepolymer dispersion may be formed in the substantial absence of a monohydroxy compound. The aqueous polyurethane prepolymer dispersion may be formed in the substantial absence of a siccative curing or drying agent. The aqueous polyurethane prepolymer dispersion may be formed in the substantial absence of an amino acid. The aqueous polyurethane prepolymer dispersion may be formed in the substantial absence of an ammonium compound. The aqueous polyurethane prepolymer dispersion may be formed in the substantial absence of a silane compound. The aqueous polyurethane prepolymer dispersion may be formed in the substantial absence of a thiol or disulfide compound. The aqueous polyurethane prepolymer dispersion may be formed in the substantial absence of any combination of the preceding the preceding species of the present paragraph. Additionally or alternatively, the aqueous polyurethane prepolymer dispersion may be substantially free of any of the preceding species of the present paragraph.

In several embodiments, the aqueous polyurethane prepolymer dispersion may be employed to prepare or may be in the form of a coating or adhesive. The aqueous polyurethane prepolymer dispersion may be employed to prepare or may be in the form of a substrate coated with the polyurethane dispersion. The aqueous polyurethane prepolymer dispersion may be employed to prepare or may be in the form of a chemical agent resistance coating.

As used herein, "substituted" refers to an organic group as defined below (e.g., an alkyl group) in which one or more bonds to a hydrogen atom contained therein may be replaced by a bond to non-hydrogen or non-carbon atoms. Substituted groups also include groups in which one or more bonds to a carbon(s) or hydrogen(s) atom may be replaced by one or more bonds, including double or triple bonds, to a heteroatom. A substituted group may be substituted with one or more substituents, unless otherwise specified. In some embodiments, a substituted group may be substituted with 1, 2, 3, 4, 5, or 6 substituents. Examples of substituent groups include: halogens (e.g., F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; or nitriles. A "per"-substituted compound or group is a compound or group having all or substantially all substitutable positions substituted with the indicated substituent. For example, 1,6-diiodo perfluoro hexane indicates a compound of formula $C_6F_{12}I_2$, where all the substitutable hydrogens have been replaced with fluorine atoms. A compound may be "unsubstituted" by a recited group in that the compound is not bound to the recited functional group.

Substituted ring groups such as substituted cycloalkyl, aryl, heterocyclyl and heteroaryl groups also include rings and ring systems in which a bond to a hydrogen atom may be replaced with a bond to a carbon atom. Substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, or carboxyalkyl.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1] hexane, adamantyl, or decalinyl. Substituted cycloalkyl groups may be substituted one or more times with non-hydrogen and non-carbon groups as defined above. However, substituted cycloalkyl groups also include rings that may be substituted with straight or branched chain alkyl groups as defined above. Representative substituted cycloalkyl groups may be mono-substituted or substituted more than once, such as, but not limited to, 2,2-, 2,3-, 2,4- 2,5- or 2,6-disubstituted cyclohexyl groups, which may be substituted with substituents such as those listed above.

Aryl groups may be cyclic aromatic hydrocarbons that do not contain heteroatoms. Aryl groups herein include monocyclic, bicyclic and tricyclic ring systems. Aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups may be phenyl or naphthyl. Although the phrase "aryl groups" may include groups containing fused rings, such as fused aromatic-aliphatic ring systems (e.g., indanyl or tetrahydronaphthyl), "aryl groups" does not include aryl groups that have other groups, such as alkyl or halo groups, bonded to one of the ring members. Rather, groups such as tolyl may be referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl, which may be substituted with substituents such as those above.

Aralkyl groups may be alkyl groups as defined above in which a hydrogen or carbon bond of an alkyl group may be replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Substituted aralkyls may be substituted one or more times with substituents as listed above.

Groups described herein having two or more points of attachment (e.g., divalent, trivalent, or polyvalent) within the compound of the technology may be designated by use of the suffix, "ene." For example, divalent alkyl groups may be alkylene groups, divalent aryl groups may be arylene groups, divalent heteroaryl groups may be heteroarylene groups, and so forth. In particular, certain polymers may be described by use of the suffix "ene" in conjunction with a term describing the polymer repeat unit.

Alkoxy groups may be hydroxyl groups (—OH) in which the bond to the hydrogen atom may be replaced by a bond to a carbon atom of a substituted or unsubstituted alkyl group as defined above. Examples of linear alkoxy groups include, but are not limited to, methoxy, ethoxy, propoxy, butoxy, pentoxy, or hexoxy. Examples of branched alkoxy groups include, but are not limited to, isopropoxy, sec-butoxy, tert-butoxy, isopentoxy, or isohexoxy. Examples of cycloalkoxy groups include, but are not limited to, cyclopropyloxy, cyclobutyloxy, cyclopentyloxy, or cyclohexyloxy. Representative substituted alkoxy groups may be substituted one or more times with substituents such as those listed above.

The term "amine" (or "amino"), as used herein, refers to $NR_5R_6$ groups, wherein $R_5$ and $R_6$ may be independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine may be alkylamino, dialkylamino, arylamino, or alkylarylamino. In other embodiments, the amine may be $NH_2$, methylamino, dimethylamino, ethylamino, diethylamino, propylamino, isopropylamino, phenylamino, or benzylamino. The term "alkylamino" may be defined as $NR_7R_8$, wherein at least one of $R_7$ and $R_8$ may be alkyl and the other may be alkyl or hydrogen. The term "arylamino" may be defined as $NR_9R_{10}$, wherein at least one of $R_9$ and $R_{10}$ may be aryl and the other may be aryl or hydrogen.

The term "halogen" or "halo," as used herein, refers to bromine, chlorine, fluorine, or iodine. In some embodiments, the halogen may be fluorine. In other embodiments, the halogen may be chlorine or bromine.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the terms "coupled" or "operatively connected" are used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry.

As used in the specification and the claims, the singular forms "a," "an," and "the" include the plural unless the singular is expressly specified. For example, reference to "a compound" may include a mixture of two or more compounds, as well as a single compound.

As used herein, the term "about" in conjunction with a number is intended to include ±10% of the number. In other words, "about 10" may mean from 9 to 11.

As used herein, the terms "optional" and "optionally" mean that the subsequently described circumstance may or may not occur, so that the description includes instances where the circumstance occurs and instances where it does not.

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, and the like. As a non-limiting example, each range discussed herein can be readily broken down into a lower third, middle third and upper third, and the like. As will also be understood by one skilled in the art all language such as "up to," "at least," "greater than," "less than," include the number recited and refer to ranges which can be subsequently broken down into sub-ranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The various aspects and embodiments disclosed herein are for purposes of illustration and are not intended to be limiting, with the true scope and spirit being indicated by the following claims.

What is claimed is:

1. An aqueous polyurethane polymer dispersion that is substantially free of N-methyl-2-pyrrolidone (NMP), prepared by a process comprising:

contacting an isocyanate-reactive monomer with a tertiary amine to form a salt of an isocyanate-reactive monomer, contacting isocyanate-reactive monomers with a diisocyanate in a solution that is substantially free of NMP to form a neutralized polyurethane prepolymer, wherein the isocyanate-reactive monomers are consisting of a soybean oil polyester polyol and the salt of an isocyanate-reactive monomer, wherein the soybean polyester polyol is characterized by a hydroxyl value of 180-250 mg KOH/g and derived from ozonolysis of soybean oil polyester polyol, wherein the salt of an isocyanate-reactive monomer is at a concentration higher than 10 wt % to about 17 wt %, the soybean oil polyester polyol is at a concentration higher than 42.9% to about 51.5%, and the diisocyanate is at a concentration higher than 36.9 wt % to about 39.9 wt %, based on the neutralized polyurethane prepolymer; and contacting the neutralized polyurethane prepolymer with water to form the aqueous polyurethane prepolymer dispersion, wherein the neutralized polyurethane prepolymer is formed in the substantial absence of polyamine and dibutyl tin dilaurate.

2. The aqueous polyurethane prepolymer dispersion of claim 1, wherein the soybean oil polyester polyol comprises one or more of the following properties:
is substantially unsubstituted by sulfonate groups; and
is substantially unsubstituted by amine or ammonium groups.

3. The aqueous polyurethane prepolymer dispersion of claim 1, wherein the isocyanate-reactive monomer comprises one or more of the following properties:
is saturated;
is unsubstituted by primary amine or secondary amine groups; and
is unsubstituted by sulfur-containing groups.

4. The aqueous polyurethane prepolymer dispersion of claim 1, wherein the isocyanate-reactive monomer comprises dimethylol propionate.

5. The aqueous polyurethane prepolymer dispersion of claim 1, wherein the tertiary amine comprises trimethylamine.

6. The aqueous polyurethane prepolymer dispersion of claim 1, wherein the diisocyanate comprises isophorone diisocyanate.

7. The aqueous polyurethane prepolymer dispersion of claim 1, wherein the isocyanate-reactive monomers comprises an organic solvent and the process further comprises separating the organic solvent from the neutralized polyurethane prepolymer.

8. The aqueous polyurethane prepolymer dispersion of claim 1, wherein the aqueous polyurethane prepolymer dispersion is substantially or completely free of organic solvent.

9. The aqueous polyurethane prepolymer dispersion of claim 1, wherein the neutralized polyurethane prepolymer comprises less than about one free isocyanate group per molecule of the neutralized polyurethane prepolymer.

10. The aqueous polyurethane prepolymer dispersion of claim 1, wherein the neutralized polyurethane prepolymer is substantially free of unreacted isocyanate groups.

11. The aqueous polyurethane prepolymer dispersion of claim 1, wherein the neutralized polyurethane prepolymer is substantially free of silane functional groups.

12. The aqueous polyurethane prepolymer dispersion of claim 1, wherein the neutralized polyurethane prepolymer is substantially free of thiol or disulfide groups.

13. The aqueous polyurethane prepolymer dispersion of claim 1, wherein the neutralized polyurethane prepolymer is substantially free of hydrazine-reactive ketone groups.

14. The aqueous polyurethane prepolymer dispersion of claim 1, wherein the neutralized polyurethane prepolymer is formed in the substantial absence of and/or being substantially free of one or more of: an alkylene glycol; an alkylene glycol ether; a surfactant or surface active agent other than the isocyanate-reactive monomer; a polyamine; an amino alcohol; an alkanol amide; a polyol other than the soybean oil polyester polyol or the isocyanate- reactive monomer; a metal-containing catalyst; collagen; hydrazine or a hydrazone; an unsaturated species other than the soybean oil polyester polyol; an isocyanate blocking group; an epoxidized or partially epoxidized triglyceride; an alkyd or alkyd resin; a monohydroxy compound; a siccative; an amino acid; an ammonium compound; a silane compound; a thiol compound; and a disulfide compound.

15. The aqueous polyurethane prepolymer dispersion of claim 1, wherein the neutralized polyurethane prepolymer is formed in the substantial absence of and/or being substantially free of one or more of: an alkylene glycol; an alkylene glycol ether; a surfactant or surface active agent other than the isocyanate-reactive monomer; a polyamine; an amino alcohol; an alkanol amide; a polyol other than the soybean oil polyester polyol or the isocyanate-reactive monomer; a metal-containing catalyst; collagen; hydrazine or a hydrazone; an unsaturated species other than the soybean oil polyester polyol; an isocyanate blocking group; an epoxidized or partially epoxidized triglyceride; an alkyd or alkyd resin; a monohydroxy compound; a siccative; an amino acid; an ammonium compound; a silane compound; a thiol compound; and a disulfide compound.

16. A substrate coated with an aqueous polyurethane prepolymer dispersion that is substantially free of N-methyl-2-pyrrolidone (NMP), the aqueous polyurethane prepolymer dispersion prepared by a process comprising:

contacting an isocyanate-reactive monomer with a tertiary amine to form a salt of an isocyanate-reactive monomer, contacting isocyanate-reactive monomers with a diisocyanate in a solution that is substantially free of NMP to form a neutralized polyurethane prepolymer, wherein the isocyanate-reactive monomers are consisting of a soybean oil polyester polyol and the salt of an isocyanate-reactive monomer, wherein the soybean oil polyester polyol is characterized by a hydroxyl value of 180-250 mg KOH/g, and derived from ozonolysis of soybean oil and subsequent esterification of the acids produced from ozonolysis, wherein the salt of an isocyanate-reactive monomer is at a concentration higher than 42.9% to about 51.5%, and the diisocyanate being is at a concentration higher than 36.9 wt % to about 39.9 wt %, based on the neutralized polyurethane prepolymer; and contacting the neutralized polyurethane prepolymer with water to form the aqueous polyurethane prepolymer dispersion, wherein the neutralized polyurethane prepolymer is formed in the substantial absence of polyamine and dibutyl tin dilaurate.

* * * * *